United States Patent
Drexler et al.

(10) Patent No.: US 7,441,125 B2
(45) Date of Patent: Oct. 21, 2008

(54) PORTABLE DATA CARRIER PROVIDE WITH ACCESS PROTECTION BY RENDERING MESSAGES UNFAMILIAR

(75) Inventors: Hermann Drexler, Munich (DE); Harald Vater, Giessen (DE)

(73) Assignee: Giesecke & Devrient GmbH, Munich (DE)

( * ) Notice: Subject to any disclaimer, the term of this patent is extended or adjusted under 35 U.S.C. 154(b) by 805 days.

(21) Appl. No.: 10/168,549

(22) PCT Filed: Dec. 20, 2000

(86) PCT No.: PCT/EP00/13029

§ 371 (c)(1),
(2), (4) Date: Sep. 11, 2002

(87) PCT Pub. No.: WO01/48706

PCT Pub. Date: Jul. 5, 2001

(65) Prior Publication Data

US 2003/0079139 A1    Apr. 24, 2003

(30) Foreign Application Priority Data

Dec. 28, 1999  (DE) ................................ 199 63 407

(51) Int. Cl.
*H04L 9/00*    (2006.01)
*H04K 1/00*    (2006.01)

(52) U.S. Cl. ........................... 713/193; 713/194; 380/44
(58) Field of Classification Search .................. 713/193
See application file for complete search history.

(56) References Cited

U.S. PATENT DOCUMENTS

| 5,222,139 | A | * | 6/1993 | Takaragi et al. ............... 380/28 |
| 5,991,415 | A | * | 11/1999 | Shamir ....................... 380/30 |
| 6,064,740 | A | * | 5/2000 | Curiger et al. .............. 380/265 |
| 6,615,354 | B1 | * | 9/2003 | Ohki et al. .................. 713/193 |
| 6,870,929 | B1 | * | 3/2005 | Greene ........................ 380/28 |
| 6,907,126 | B2 | * | 6/2005 | Inada ......................... 380/255 |
| 2001/0053220 | A1 | * | 12/2001 | Kocher et al. ................. 380/29 |
| 2002/0010679 | A1 | * | 1/2002 | Felsher ........................ 705/51 |

FOREIGN PATENT DOCUMENTS

EP    0 682 327 A2    11/1995

* cited by examiner

*Primary Examiner*—Christopher A Revak
(74) *Attorney, Agent, or Firm*—Bacon & Thomas, PLLC

(57) ABSTRACT

The invention relates to a data storage medium having a semiconductor chip which has at least one memory in which an operating program is stored which contains a number of commands, with each command producing signals which can be detected from outside the semiconductor chip. According to the invention, the data storage medium is designed such that data which is used more than once for a calculation process is scrambled using different functions.

7 Claims, No Drawings

PORTABLE DATA CARRIER PROVIDE WITH ACCESS PROTECTION BY RENDERING MESSAGES UNFAMILIAR

The invention relates to a data storage medium which has a semiconductor chip in which secret data is stored and is processed.

BACKGROUND OF THE INVENTION

Data storage media which contain a chip are used in a large number of different applications, for example in order to carry out financial transactions, for payment for goods or services, or as an identification means for controlling access checks. In all these applications, secret data which must be protected against access by unauthorized third parties is generally processed within the chip of the data storage medium. This protection is ensured inter alia by the fact that the internal structures of the chip have very small dimensions so that access to these structures with the aim of extracting data which is being processed in these structures is very difficult. In order to make access even harder, the chip can be embedded in a very securely adhering compound whose forced removal results in the semiconductor wafer being destroyed, or at least in the secret data stored in it being erased. It is likewise also possible to provide the semiconductor wafer with a protective layer during its production process, which cannot be removed without destroying the semiconductor wafer.

With appropriate technical equipment, which admittedly is extremely expensive but is nevertheless in principle available, it would be possible for an attacker to expose the internal structure of the chip, and to investigate it. The internal structure of the chip could be exposed, for example, by means of special etching methods or by means of a suitable grinding process. The structures of the chip exposed in this way, such as interconnects, could be made contact with using microprobes or could be investigated using other methods in order to determine the signal waveforms in these structures. It would then be possible to attempt to use the detected signals to determine secret data from the data storage medium, such as secret keys, in order to use these for manipulation purposes. It would likewise be possible to attempt to deliberately influence the signal waveforms in the exposed structures via the microprobes.

Recently, furthermore, methods have become known which allow the secret data, in particular the secret key, to be deduced by measuring the current consumption or the timing for the encryption process (Paul C. Kocher, "Timing Attacks on implementation of Diffie-Hellman, RSA, DSS, and other Systems", Springer Verlag 1998; WO 99/35782).

One simple attack of this type is the "Simple Power Analysis" (SPA). In this analysis method, by way of example, a known message M is subjected to encryption using a secret key d, that is to say the encrypted text $Y=M^d \bmod n$ is formed. During the modular exponentiation process, a squaring operation is carried out with the intermediate result and a multiplication operation is carried out with M if there is a "1" in the exponent d, while only a squaring operation with the intermediate result is carried out if there is a "0" in d. If M is known, the times at which the message M is used can be identified by observing the current response and/or the timing during the operations. Since this message is always used if a "1" is present in d, the key can be deduced without any problems.

This attack can be countered by making changes in the message M or in the key d. Analysis methods are, however, known from Paul C. Kocher, "Timing attacks on implementation of Diffie-Hellman, RSA, DSS, and other Systems", Springer Verlag 1998 and from the international patent application WO 99/35782, in which the key can be deduced even if the message or the key is modified, that is to say scrambled, by recording a large number of measurement curves in which the current response of the integrated circuit is measured ("Differential Power Analysis" (DPA) or Higher Order DPA).

In order to make it impossible to identify the key easily by identifying, during the calculation process, the use of the message to be encrypted, it has already been proposed for a factor r*n to be added for the encryption of the message. The encryption text $Y=M^d \bmod n$ is thus changed to $(M+r*n)^d \bmod n$. This means that it is impossible to get back to the known message M in an analysis process. However, even with this change to the message text M, repetition of specific patterns can be identified by observing the current curve. There is a high probability of these correlated patterns containing (M+r*n), so that in this case as well, it is possible to deduce the multiplication and hence a 1 in the secret key.

A further problem occurs if it is possible to identify during the current analysis process whether a multiplication process is carried out using the same factors (which corresponds to a squaring operation with the intermediate result) or different factors (which corresponds to a multiplication operation of the intermediate result by the message), since it is also in this way possible to identify multiplications by (M+r*n).

SUMMARY OF THE INVENTION

One object of the invention is thus to protect secret data, which is contained in the chip of a portable data storage medium, against unauthorized access, with the aim of ensuring that the data is still used efficiently, as before.

This object is achieved against the background of the pre-characterizing clause of claims 1 and 5 by the characterizing features of the respective claim.

DETAILED DESCRIPTION OF THE EMBODIMENTS

The invention is based on a data storage medium having a semiconductor chip which has at least one memory in which an operating program is stored which contains a number of commands, with each command producing signals which can be detected from outside the semiconductor chip.

According to the invention, the data storage medium is designed to use different functions to scramble data which is used more than once for a calculation process.

The data may thus be a message but may also be intermediate results which are obtained by carrying out a computation process, or else data which is stored in the data storage medium.

The data to be scrambled is preferably a message which is to be encrypted.

It is also possible to provide for the data to be an intermediate result and for a subsequent squaring operation to be carried out as a multiplication, with the intermediate result having previously been scrambled using different functions, or for the data to be an intermediate result and for the intermediate result then to be duplicated as an addition process, with the intermediate result having previously been scrambled using different functions. This advantageously also makes it possible for operations with the intermediate result (squaring, addition, etc.) to be made secure.

In particular, the invention provides for the function scrambling to be provided in the form of encryption by means of modulo operations in which the message M is used if there is a "1" in the exponent d, and for the message M to be varied using a different function for each use.

According to one advantageous refinement of the invention, the message is scrambled by adding a factor $r_i*n$ (n is the modulus), where $r_i$ may have a different value for each i, to the message M for each use i (i=1 ... k). Powers of the message M may also occur a number of times in other calculation methods, to which $r_i*n$ is then added for each use.

A further improvement in security is achieved if the modulus n is multiplied by a constant factor k, and if a further modulo operation with the modulus n is carried out only later, since the intermediate results are then likewise scrambled.

The invention will be explained in the following text with reference to an exemplary embodiment for modular exponentiation. Without any restriction to generality, it is assumed that the modular exponentiation is calculated in order to form an encrypted message $Y=M^d$ mod n in that a squaring operation with the intermediate result as well as a multiplication by the message M are carried out if there is a "1" in d, and a squaring operation with the intermediate result is carried out if there is a "0".

According to the invention, a random number r is first of all chosen, and the product r*n is formed, for the encryption process. The exponentiation process then starts with a squaring operation, in which the product r*n is added to the intermediate result Z in order to calculate the expression $(Z*(Z+r*n))$ mod k*n, where k is an integer, instead of Z*Z mod n. In the situation where the exponent, that is to say the secret key d, contains a "1" at that point, this is followed by a multiplication operation for which, first of all, $(r_i*n)$ is added to the message M, that is to say $M+r_i*n$ is formed and $(Z*(M+r_i*n))$ mod k*n)) is calculated instead of Z*M mod n. The process passes through this loop until all the digits in the secret key have been processed, with i being incremented by 1 for the next multiplication process in each case. The result is also mod n reduced after completion of an exponentiation process.

As a result of the characteristic that the addition of an integer multiple of the modulus to the message M does not change the result, an extension such as this can be introduced without any problems, resulting in the advantage that the message M can no longer be obtained by analysis of the current response of the chip, since successive processing operations on the message are no longer correlated and it is thus impossible to identify an identical, repeating pattern.

Furthermore, during an analysis process, it is now virtually impossible to distinguish a multiplication operation from a squaring operation, since not only the intermediate results Z but also the processed message $M+r_i*n$ change in each operation, and a product between the intermediate result and a factor which is not correlated with it are thus formed not only in a multiplication operation but also in a squaring operation.

A further improvement in security can also be achieved in that security-critical computation operations f(z) which have a correlation between z and f(z) are split into computation operations g1(z) and (g2f(g1(z)), so that g1(z) and g2f(g1(z)) are not correlated with one another. g1(z) and g2(z) are in this case suitable scrambling functions.

The invention claimed is:

1. A data storage medium comprising a semiconductor chip which has at least one memory in which an operating program is stored which contains a number of commands, with each command producing signals which can be detected from outside the semiconductor chip, wherein the data storage medium is arranged to use different functions to scramble data which is used more than once for a calculation process for each use, wherein the calculation comprises an encryption process by means of modulo operations, in which a message M is used if there is a "1" in the exponent d, and the message M is varied using a different function for each use.

2. A data storage medium comprising a semiconductor chip which has at least one memory in which an operating program is stored which contains a number of commands, with each command producing signals which can be detected from outside the semiconductor chip, wherein the data storage medium is arranged to use different functions to scramble data which is used more than once for a calculation process for each use, wherein a factor $r_i*n$ is added to a message M for each use i (i=1 ... k), where r is a random number and n is the modulus.

3. A data storage medium according to claim 2, wherein $r_i$ is the same for all i.

4. A method for protection of secret data in data storage media having a semiconductor chip which has at least one memory in which an operating program is stored which contains a number of commands, with each command producing signals which can be detected from outside the semiconductor chip, comprising scrambling data which is used more than once for a calculation process using different functions, wherein the calculation comprises an encryption process by means of modulo operations, in which a message M is used if there is a "1" in the exponent d, and the message M is varied using a different function for each use.

5. A method for protection of secret data in data storage media having a semiconductor chip which has at least one memory in which an operating program is stored which contains a number of commands, with each command producing signals which can be detected from outside the semiconductor chip, comprising scrambling data which is used more than once for a calculation process using different functions, wherein a factor $r_i*n$ is added to a message M for each use i (i=1 ... k), where $r_i$ is a random number and n is the modulus.

6. A method according to claim 5, wherein $r_i$ is the same for all i.

7. A method for protection of secret data in data storage media having a semiconductor chip which has at least one memory in which an operating program is stored which contains a number of commands, with each command producing signals which can be detected from outside the semiconductor chip, comprising scrambling data which is used more than once for a calculation process using different functions, wherein security-critical computation operations f(z) which have a correlation between z and f(z) are split into computation operations g1(z) and (g2f (g1 (z)), so that g1 (z) and (g2f (g1 (z)) are not correlated with one another.

* * * * *